106-89 AU 115 EX
2/15/77 OR 4,008,093

United States Patent [19] [11] 4,008,093
Kitsuda et al. [45] Feb. 15, 1977

[54] CONTROL METHOD AND EQUIPMENT FOR CHARGING READY-MIXED CONCRETE ADDITIVES BATCHWISE

[75] Inventors: Toshiyuki Kitsuda, Morioka; Kenichi Hattori, Musashino; Hiromi Nakagawa, Wakayama; Mitsuru Wakao, Sagamihara; Tsunehisa Matsuda, Urawa, all of Japan

[73] Assignees: Japanese National Railways; Kao Soap Co., Ltd.; Kayabakogyo K.K., all of Tokyo, Japan

[22] Filed: July 8, 1974

[21] Appl. No.: 486,348

[30] Foreign Application Priority Data

July 12, 1973 Japan .............................. 48-77938

[52] U.S. Cl. .................................. 106/89; 106/90; 106/97

[51] Int. Cl.² .......................................... C04B 7/02

[58] Field of Search ......................... 106/90, 97, 89

[56] References Cited

UNITED STATES PATENTS 3,788,868 1/1974 Kitsuda et al. ...................... 106/90

*Primary Examiner*—J. Poer
*Attorney, Agent, or Firm*—Saul Jecies

[57] ABSTRACT

A control method for charging ready-mixed concrete additives batchwise which aims at keeping the slump of ready-mixed concrete within a certain range and making longer transportation by truck mixer possible without degrading the quality, where the slump of ready-mixed concrete is detected electrically as a change in the mixing torque so that, when this detected value reaches a value set beforehand, a motor receives a control instruction to charge additives for adjusting slump into the ready-mixed concrete and so that the operating time of the motor for charging additives and the interval until control operation is reset may be adjusted with a timer.

4 Claims, 5 Drawing Figures

CONTROL METHOD AND EQUIPMENT FOR CHARGING READY-MIXED CONCRETE ADDITIVES BATCHWISE

BACKGROUND OF THE INVENTION

The present invention relates to a control method and equipment for charging ready-mixed concrete additives batchwise, where the charging additives for adjusting the slump are applied to ready-mixed concrete in batches of stipulated size at stipulated times, thus keeping its slump in a certain range without degrading the quality and making longer transportation possible.

When ready-mixed concrete is transported by a truck mixer after being charged at a mixing plant, its reaction proceeds with the progress of time, making it gradually more sticky, harder and less fluid and thus degrading its workability. Generally, the fluidity of ready-mixed concrete is measured as the slump value. Soft ready-mixed concrete of about 20 cm slump is used for steel-reinforced concrete work and hard concrete of about 5 cm slump is used for civil engineering work.

The maximum transportation time of ready-mixed concrete with a truck mixer is normally about one hour and a half, although it may be extended to about 2 hours if ready-mixed concrete of higher slump with added water is charged into the truck mixer, taking a decrease in the slump (hereinafter referred to as slump loss) during transportation into account.

High strength concrete having a water-cement ratio of about 30%, however, shows particularly significant slump loss with the progress of time. Nevertheless, if water is added in excess beforehand to compensate, it will cause the problem that the desired strength of the concrete cannot be achieved. For this reason, it may be said that concrete of this kind should not be transported by a truck mixer but should be mixed at the work site. Still, in view of the quality control or construction setup at the site, the problem should preferably be solved by using ready-mixed concrete transported by truck mixer.

Thus, as a countermeasure against the slump loss of concrete during transportation by truck mixer, additives having properties that may control freely the slump of concrete of this kind during transportation by truck mixer have been sought and developed very recently. These additives are surfactants of a certain type effective not only in preventing slump loss without adding water in excess and without producing any adverse effects on the strength as they are added little by little, while being stirred, into ready-mixed concrete during transportation by truck but also to obtain high strength concrete having excellent quality and workability. The long distance transportation of high strength ready-mixed concrete is thus perhaps possible, although it has been considered so far impracticable.

Still, there remains the problem of how to adjust the dose and interval of charging these additives. The reason is that, if they are added in excess, the ready-mixed concrete will have too high a slump to maintain its workability whereas, if their addition is insufficient, the slump will not be reduced properly. Furthermore, the adjustment may vary depending on the cement quality according to the cement maker, the ambient temperature or the mixing. Unless adjustment is done properly, taking these factors into account, ready-mixed concrete of constant slump may not be obtained.

In this case, although the size of each batch of additives may be determined readily from the amount of ready-mixed concrete, the interval of charging may hardly be determined beforehand as the reactivity of ready-mixed concrete may vary. Nevertheless, from the point of view of safety, the drivers of truck mixers should not have to adjust the additive charge while checking the slump condition of ready-mixed concrete during transportation. This also raises a problem in relation to the quality of ready-mixed concrete.

SUMMARY OF THE INVENTION

Considering these defects, the purpose of the present invention is to offer a new method and equipment for charging ready-mixed concrete additives batchwise in truck mixers, where, as the slump of ready-mixed concrete falls below a certain value stipulated beforehand, this is detected automatically and additives for adjusting the slump are charged in a stipulated dose into the ready-mixed concrete to make it more transportable by keeping its slump value within a certain range for a longer period of time.

Namely, we have noticed experimentally that the slump value and the mixing torque of ready-mixed concrete in truck mixers change in inverse proportion and thus we have employed the said mixing torque and, for truck mixers with hydraulic drive, the working hydraulic pressure, which is proportional to the former, so as to detect the slump value of ready-mixed concrete indirectly. Accordingly, as the slump falls to a stipulated value, the control unit works for a certain period of time stipulated beforehand so as to charge a stipulated dose of additives into the ready-mixed concrete and then it stops for a stipulated period of time until it resets the control unit. Thus, ready-mixed concrete may be adjusted to a certain range of slump and made more transportable for a longer period of time without degrading its quality.

Referring to the enclosed figures, the above and other purposes, features and performances of the present invention may be understood fully by the following description of an application example.

Figure 1:
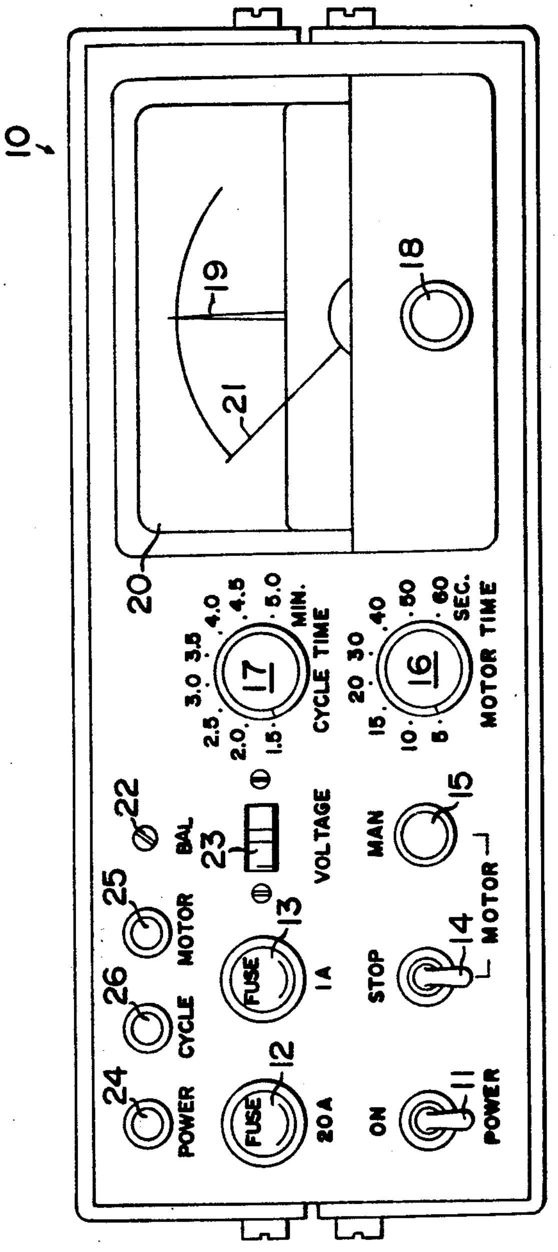
FIG. 1 is an outside view of an application of the control equipment for charging ready-mixed concrete additives batchwise in truck mixers according to the present invention.

DESCRIPTION OF THE PREFERRED EMBODIMENT:

Referring to FIG. 1, showing an outside view of an example of the control equipment for charging additives batchwise according to the present invention, it is provided with an electricity supply switch 11, fuses 12, 13, change-over switch 14 and push button switch 15 for a motor driving a pump for charging additives, a motor time dial 16 for setting the working time of the motor, a cycle time dial 17 for setting the interval between the stopping time of the said motor and its restarting, a monitor meter 20 incorporating a slump setting pick-up 18 for setting the expected slump value of ready-mixed concrete beforehand and a slump setting needle 19, a zero point control pick-up 22 for the ammeter needle 21 of the said monitor meter 20, a voltmeter 23, pilot lamps 24, 25 for indicating the condition of the said electricity supply switch 11 and of the motor of the pump for charging additives, respectively, and another pilot lamp 26 for indicating whether or not the said motor has started the next control cycle.

Figures 2, 3:
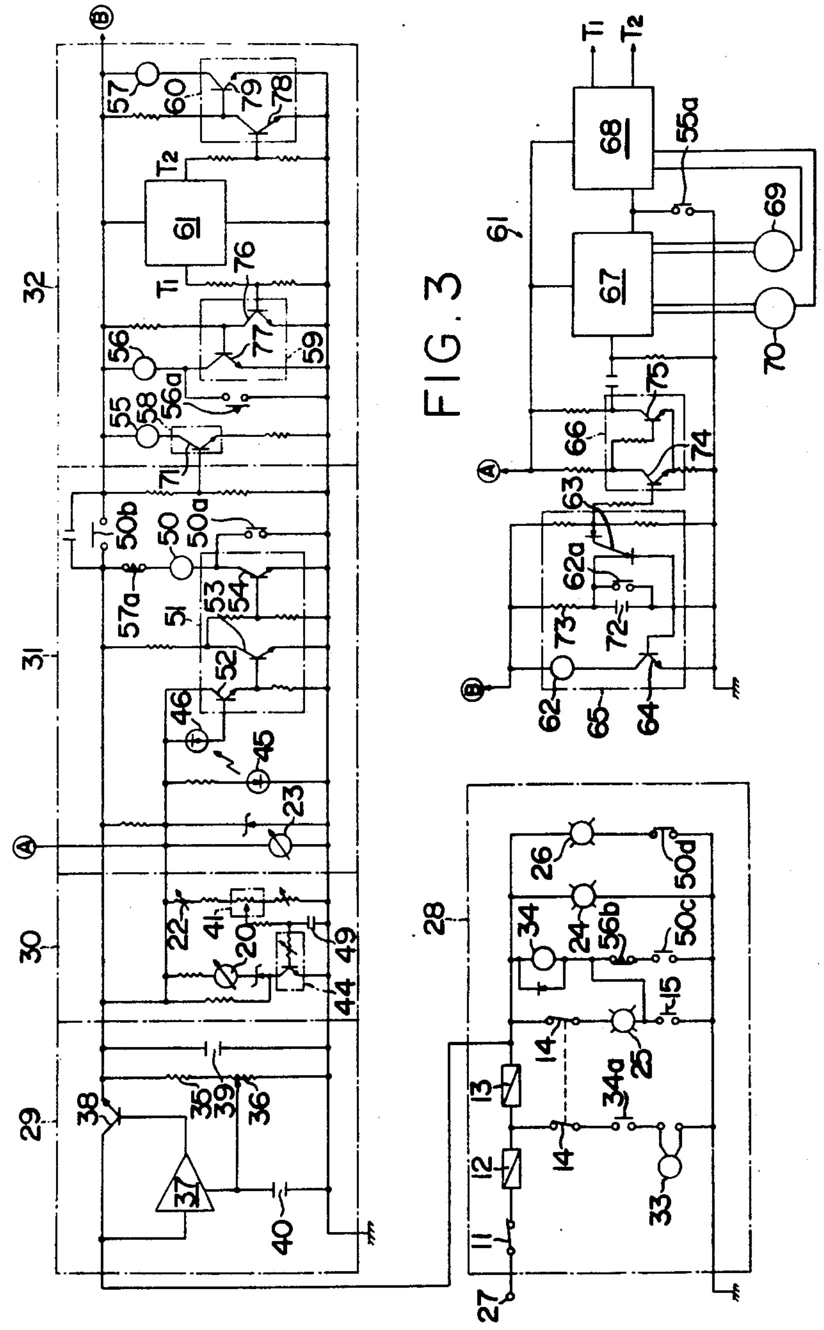
FIG. 2 is a diagram showing an example of the control circuit.
FIG. 3 is an example circuit diagram of a timer used in the control circuit.

FIG. 2 shows an example of a control circuit of the present control equipment 10 for batchwise charging of additives. Its electricity is supplied, for instance, from the batteries of truck mixers through a terminal 27. As seen from the figure, the control circuit consists of a switching circuit 28, a voltage stabilizing circuit 29, a monitor meter circuit 30, a meter relay circuit 31 and a timer circuit 32. All the elements shown in FIG. 1 are incorporated in these circuits. In FIG. 2, they are represented by the same numerals as in FIG. 1.

The said switching circuit 28 incorporates an electricity supply switch 11, fuses 12, 13, a change-over switch 14, a push-button switch 15 and pilot lamps 24, 25, 26. The electricity supply switch 11 brings the present control equipment 10 for batchwise charging of additives into operation when it is closed and this is indicated by the lighting pilot lamp 24. During control operation, the changeover switch 14 is always kept closed so that the circuit of the motor 33 driving the pump for charging additives may be kept in operation. Whenever it is opened, however, the motor 33 will be stopped irrespective of the control operation. On the other hand, whenever the pushbutton switch 15 is closed, the relay 34 will be activated and close the relay contact 34*a* to work the motor 33, thus making it possible to charge additives by hand operation independently of the control. Whenever the motor 33 is in operation, the pilot lamp 25 is lit, indicating that additive charging is in operation.

If batteries mounted on truck mixers are used as the electricity source, the voltage may vary according to their charge cycle, making it difficult to operate the present control equipment 10 for batchwise charging of additives consistently. Thus, the voltage stabilizing circuit 29 works to keep the voltage constant automatically irrespective of fluctuations in the voltage of the batteries. Namely, the voltage stabilizing circuit 29 divides the output voltage with resistances 35, 36, compares the divided voltage with the standard by feeding it back to a constant-voltage element 37 and thus keeps the output voltage constant by controlling a transistor 38 according to the deviation from the standard, irrespective of the changing input voltage. Condensers 39, 40 in this circuit are to remove high frequency ripples from both the output voltage and the feedback voltage.

Figure 4:
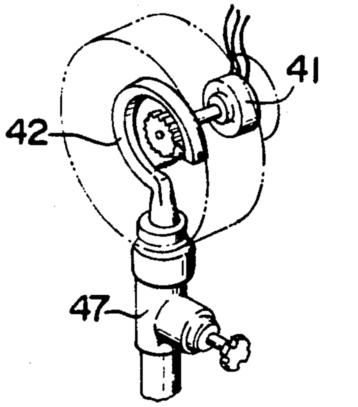
FIGS. 4 and 5 show an example of a detector for converting the working hydraulic pressure of mixers to electrical resistance.
Figure 5:
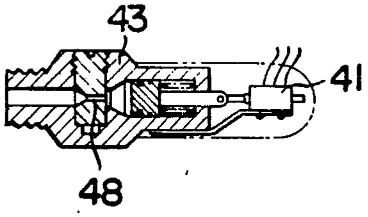

The monitor meter circuit 30 is provided with a monitor meter 20 and potentiometer 41. The potentiometer 41 interlocks, as shown in FIG. 4, with a Bourdon tube-type pressure gauge 42, or as shown in FIG. 5, a piston type gauge 43 so that the working hydraulic pressure of mixers may be detected in the form of changing electrical resistance values with the pressure gauge 42 or 43. In this case, instead of converting the detected working hydraulic pressure of mixers to a resistance value of the potentiometer 41 as mentioned above, the driving torque of mixers may also be detected as changes in the electrical resistance value with a torque meter installed in the middle of the driving shaft of mixers. As the changing electrical resistance value operates an ammeter embedded in the monitor meter 20 through an amplifier 44, the ammeter needle 21 swings. When the ammeter needle 21 reaches a position set beforehand with the slump setting pick-up 18 of the monitor meter 20, i.e., the position where it overlaps with the slump setting needle 19, the meter relay circuit 31 is broken between its light emission diode 45 and phototransistor 46, thus giving an instruction signal to the meter relay 31. This means that, as the slump of ready-mixed concrete falls to the value set beforehand with the setting pick-up 18 of the monitor meter 20, an instruction signal is given to the meter relay circuit 30 according to the experimental finding that the slump value of ready-mixed concrete during transportation changes in inverse proportion to the mixing torque or the working hydraulic pressure of truck mixers.

When the working hydraulic pressure or driving torque of mixers is detected as changes in electrical resistance so as to detect the slump value of ready-mixed concrete indirectly as the yaw angle of an ammeter needle 21 in the said manner, however, there is a danger of operation being started in error when the slump of ready-mixed concrete has not yet fallen to the set value, because the ammeter needle 21 may swing to the set position and produce an instruction signal to the meter relay 31 due to factors such as pulsations of the hydraulic pump of the mixer and changes in the driving torque as the mixer rotor hits stones. In order to prevent this in the present application example, not only is an orifice 47 or 48 placed in the way of the said pressure gauge 42 or 43 to cut the swing of the ammeter needle 21, but also a condenser 49 is inserted in the said monitor meter circuit 30 to prevent such swings electrically.

The meter relay circuit 31 involves a relay 50 and its operating circuit 51 in addition to the light emission diode 45 and phototransistor 46. As it is broken between the light emission diode 45 and the phototransistor 46, transistors 52, 53, 54 in the operating circuit 51, so far non-conductive, become conductive one by one. As the last transistor 54 switches to conductive, the relay 50 is activated and relay contacts 50*a*, 50*b* in the meter relay circuit 31 and 50*c*, 50*d* in the said switching circuit 28 are all closed. The closure of the relay contact 50*a* effects the holding of the relay 50. The closure of relay contact 50*c* activates a relay 34 in the switching circuit 28 connected to it in series and closes the relay contact 34*a* to close the circuit of the motor 33. As the motor 33 turns, it brings the pump into operation to charge additives into the ready-mixed concrete and simultaneously lights a pilot lamp 25 indicating that additive charging is in operation. In parallel with this, the closure of the relay contact 50*d* lights a pilot lamp 26 indicating that the present control equipment 10 for batchwise charging has entered the working cycle. Furthermore, the closure of the relay contact 50*b* of the meter relay circuit 31 side simultaneously brings the timer circuit 32 into the closed state, instructing 32 to commence counting.

The timer circuit 32 is provided with relays of various types 55, 56, 57, their own operating circuits 58, 59, 60 and a timer 61. As seen in FIG. 3, the timer 61 consists of an oscillation circuit 65 incorporating a relay 62 and relay contact 62*a*, oscillator 63 and transistor 64, an amplification circuit 66, a counter 67, a gate circuit 68 and rotary switches 69, 70 interlocking with the motor time dial 16 and the cycle time dial 17, respectively. Therefore, as the timer circuit 32 receives an instruction to commence counting from the said meter relay circuit 31, a transistor in the working circuit 58 becomes conductive and the relay 55 is activated to close the relay contact 55a (See FIG. 3). Simultaneously, the oscillator 63 of the oscillation circuit 62 in the timer 61 starts oscillating at a constant frequency which is determined by the condenser 72 and resistance 73. This is passed, amplified by transistors 74, 75 of the amplification circuit 66, to the counter 67 and counted. The time interval setting of the timer 61 is done by changing the pulse number as the rotary switches 69, 70, respectively, of the motor dial 16 and the cycle time dial 17 are turned.

As the said time $T_1$ set by turning the rotary switch 69 of the motor time dial 16 passes, the output from the gate circuit 68 is applied first to a relay 56 through transistors 76, 77. The said relay 56 thus activated not only closes its relay contact 56a in the timer circuit 32, but also opens a relay contact 56b in the switching circuit 28. Closure of the relay contact 56a effects the holding of relay 56. Opening of the relay contact 56b causes the relay 34 to open its relay contact 34a. Thus, the motor 33 of the pump for charging additives is stopped and the additive charging is stopped. Besides, opening of the relay contact 56b cuts the circuit of the pilot lamp 25 and the lamp goes out indicating that the motor 33 has been stopped, i.e., that additive charging is over. Under these conditions, the relay 56 is held due to its closed relay contact 56a so as to keep the relay contact 56b open, and therefore the motor 33 remains stopped irrespective of the slump value of the ready-mixed concrete. Now, after being driven for a stipulated time set on the motor time dial 16, the motor 33 is stopped and therefore additives have been charged in the desired dose to the ready-mix concrete.

Next, when the other time $T_2$ set by the cycle time dial 17 is passed, the output from the gate circuit 68 is applied to a relay 57 through transistors 78, 79 of the working circuit 60 so as to activate it and open the relay contact 57a in the meter relay circuit 31. As a result, the relay 50 is affected and its relay contacts 50a, 50b, 50c, 50d are all opened. Due to the opening of the relay contact 50a, the relay 50 is freed, while, due to the opening of the relay 50b, the electric current to the timer circuit 32 is cut, so that relays 55, 56, 57 are all affected bringing their respective relay contacts 55a, 56a, 56b, 57a back to the initial positions. In this case, the counter 67 is re-set as the relay contact 55a is opened. Besides, the pilot lamp 26 goes out simultaneously with the opening of the relay contact 50d as the said relay 50 is affected, indicating that the first cycle time is over and that it is ready for the next control operation. As stated above, the next charging operation is stopped by the cycle time dial 17 until a stipulated time passes after the preceding additive charging operation has finished. This is helpful to prevent the danger of additives being charged in excess, as it is quite possible, otherwise, that the control circuit may start the additive charging operation again before additives previously charged are mixed well with the ready-mixed concrete, i.e., before the actual slump of ready-mixed concrete rises above the stipulated value again.

Thus, the present control equipment 10 for batchwise charging of additives is brought back to the initial position in preparation for the next control operation. Since the operation is repeated in the same manner thereafter, batchwise charging of additives into the ready-mixed concrete may be achieved, keeping its slump value within a required range.

As stated above, according to the present invention, additives may be charged batchwise automatically into ready-mixed concrete without any action by the drivers of truck mixers in order to keep its slump value within a certain range for a long period of time, thus making longer distance transportation possible without degrading the quality.

Although we have described so far a preferred application, it is clear that a number of modifications and variations may be practiced without deviating from the principle of the present invention. We hope, therefore, that all such modifications and variations which may produce practically the effect of the present invention by using any equipment practically identical or equivalent to that of the present invention will be included in the following scope of patent claims.

What is claimed is:

1. A control method for the batchwise charging of ready-mixed concrete, comprising the steps of
   - mixing the concrete until a slump change occurs in the concrete;
   - detecting the occurrence of the slump change as a function of a change in the mixing torque required for effecting said mixing;
   - initiating a signal when said change in the mixing torque reaches a predetermined level; and
   - utilizing said signal to initiate dispensing of slump-adjusting additives into said concrete for a timed period.

2. A control method as defined in claim 1, the concrete being mixed by a motor; and wherein the step of detecting comprises measuring changes in the motor torque.

3. A control method as defined in claim 1, the concrete being mixed by a hydraulic drive having a hydraulic working pressure; and wherein the step of detecting comprises measuring changes in said working pressure.

4. A control method as defined in claim 3; and further comprising the step of suppressing externally originating peaks and pulses of the working pressure so as to prevent them from influencing the initiation of said signal.

* * * * *